United States Patent
Khermosh et al.

(10) Patent No.: US 7,343,540 B2
(45) Date of Patent: Mar. 11, 2008

(54) FORWARD ERROR CORRECTION CODING IN ETHERNET NETWORKS

(75) Inventors: Lior Khermosh, Glvataim (IL); Ariel Maislos, Sunnyvale, CA (US); Onn Haran, San Jose, CA (US)

(73) Assignee: PMC - Sierra Israel Ltd., Herzliya Pituach (IL)

( * ) Notice: Subject to any disclaimer, the term of this patent is extended or adjusted under 35 U.S.C. 154(b) by 574 days.

(21) Appl. No.: 10/496,134

(22) PCT Filed: Apr. 25, 2002

(86) PCT No.: PCT/IB02/01370

§ 371 (c)(1),
(2), (4) Date: May 20, 2004

(87) PCT Pub. No.: WO03/092207

PCT Pub. Date: Nov. 6, 2003

(65) Prior Publication Data

US 2005/0005189 A1 Jan. 6, 2005

Related U.S. Application Data

(60) Provisional application No. 60/286,429, filed on Apr. 24, 2001.

(51) Int. Cl.
*H03M 13/00* (2006.01)
(52) U.S. Cl. .................................. 714/758; 715/781
(58) Field of Classification Search ................ 714/752, 714/755, 758, 781, 776, 558
See application file for complete search history.

(56) References Cited

U.S. PATENT DOCUMENTS

| | | | |
|---|---|---|---|
| 4,142,174 A | 2/1979 | Chen et al. | |
| 4,567,594 A | 1/1986 | Deodhar | |
| 6,662,332 B1 * | 12/2003 | Kimmitt | 714/762 |
| 6,738,935 B1 * | 5/2004 | Kimmitt | 714/701 |
| 2003/0156012 A1 * | 8/2003 | Omidi et al. | 340/310.01 |

OTHER PUBLICATIONS

Reed et al; "Polynomial Codes Over Certain Finite Fields" 8 J Soc'y Indus Application Mathematics 300, 300-04 (1960).
Shu Lin & Daniel J. Costello, JR Error Control Coding: Fundamentals and Applications (Prentice-Hall, Inc. 1983).

* cited by examiner

*Primary Examiner*—Shelly Chase
*Assistant Examiner*—Esaw Abraham
(74) *Attorney, Agent, or Firm*—Mark M. Friedman

(57) ABSTRACT

A method for improving the bit error rate of Ethernet packets applies forward error correction (FEC) coding to transmitted packets. The FEC coding is systematic block coding, and is applied so that the coded packets can be interpreted by legacy network devices that are not capable of FEC decoding. The transmit and receive state machines of FEC-capable Ethernet nodes are modified to enable the nodes to encode and/or decode the packets with the FEC code, and to adapt the nodes' respective medium access layer (MAC) and physical layer (PHY) data rates.

48 Claims, 12 Drawing Sheets

FORWARD ERROR CORRECTION CODING IN ETHERNET NETWORKS

RELATED APPLICATION

This application claims priority benefit of provisional U.S. Patent Application Ser. No. 60/286,429, filed 24 Apr. 2001, entitled Method and Apparatus for Combining an FEC in an Ethernet Network (EPON), which application is hereby incorporated by reference for all purposes.

BACKGROUND OF THE INVENTION

1. Field of the Invention

The present invention relates generally to shared medium data transmission networks. More particularly, the invention relates to the use of forward error correction coding in Ethernet networks.

2. Background

Ethernet is one of the most common digital networking technologies. Specified in the Institute of Electrical and Electronics Engineers (IEEE) standard 802.3, the technology has a large installed base of compatible network devices. (The 2000 edition of the IEEE 802.3 standard is hereby incorporated by reference as if fully set forth herein.) Ethernet technology continues to evolve, with newer and faster variants, such as the Gigabit Ethernet, providing network speeds of 1 Gigabit per second.

For several decades Ethernet has been widely used in local area networks. More recently, Ethernet has been used with increasing frequency in metro and other wide area optical network applications, including passive optical networks (PONs). In the wide area network applications, signal attenuation and link budget constraints grow in importance because of the distances involved and because of the optical power splitters that may be used along a link between a transmitter and a receiver.

At some point along the link, a signal may be attenuated and distorted to such a degree, that the information it carries cannot be extracted because of the limited sensitivity of the receiver, noise in the propagation medium, signal source-related noise, such as inter-symbol interference and mode partition noise, and other sources of noise, attenuation and distortion. But long before this point is reached, the Signal-to-Noise ratio (SNR) of the signal deteriorates and the bit error rate (BER) of the signal increases beyond what can be tolerated in a typical application.

Forward Error Correction (FEC) is one method for improving the BER of a received signal with low SNR. FEC is a coding technique that uses additional, i.e., redundant or parity-check, symbols as part of a transmission of a digital signal sequence through a physical channel. It is a species of error control codes. But, because of the presence of sufficient redundancy, when errors corrupt the received signal, the receiver not only recognizes the errors, but also corrects the errors without requesting retransmission. In practice, the improvement in the BER achieved through the use of FEC is known as coding gain.

Adding FEC capability to a legacy Ethernet network may cause errors in the Media Access Control (MAC) layer of the non-FEC capable (i.e., legacy) network elements. Moreover, applying FEC only to the payloads of the packets would not affect link budget constraints because packet headers, carrying destination information and frame boundary fields of the packets would not benefit from the improved BER of the payloads. On the other hand, applying FEC separately to the headers and separately to the payloads can make the headers unrecognizable to the non-FEC network elements.

What is needed, therefore, is a method for improving BER for a given link budget or, conversely, for increasing the link budget for a given BER, on networks with non-FEC-capable legacy network elements that are compatible with the Ethernet standard.

SUMMARY

In accordance with the principles of this invention, a method is provided for sending data packets from a transmitter to a receiver through a shared-medium digital transmission network. Each of the packets ends in a stop symbols field that delimits the end of the packet, and is followed by an interpacket gap interval. According to the method, at least a portion of each packet is divided into one or more frames, and a systematic FEC block code is applied to each frame of the packet. The systematic FEC block code keeps the data bytes visible and adds parity-check bytes to the frames. The parity-check bytes of the frames of the packet are gathered together in a parity-check field, which is added after the stop symbols field that delimits the end of the packet. A delimiter of the parity-check field of said each packet is added after the parity-check field, and the packet is transmitted from the transmitter to a receiver through the Ethernet network.

BRIEF DESCRIPTION OF THE DRAWINGS

The present invention will be explained, by way of examples only, with reference to the following description, appended claims, and accompanying figures where:

DETAILED DESCRIPTION

A representative non-limiting embodiment of the present invention solves the need described above by applying FEC coding to Ethernet packets in a flexible way that extends the benefits of FEC to packet headers, and does not cause errors in legacy Ethernet network elements.

Figure 1:
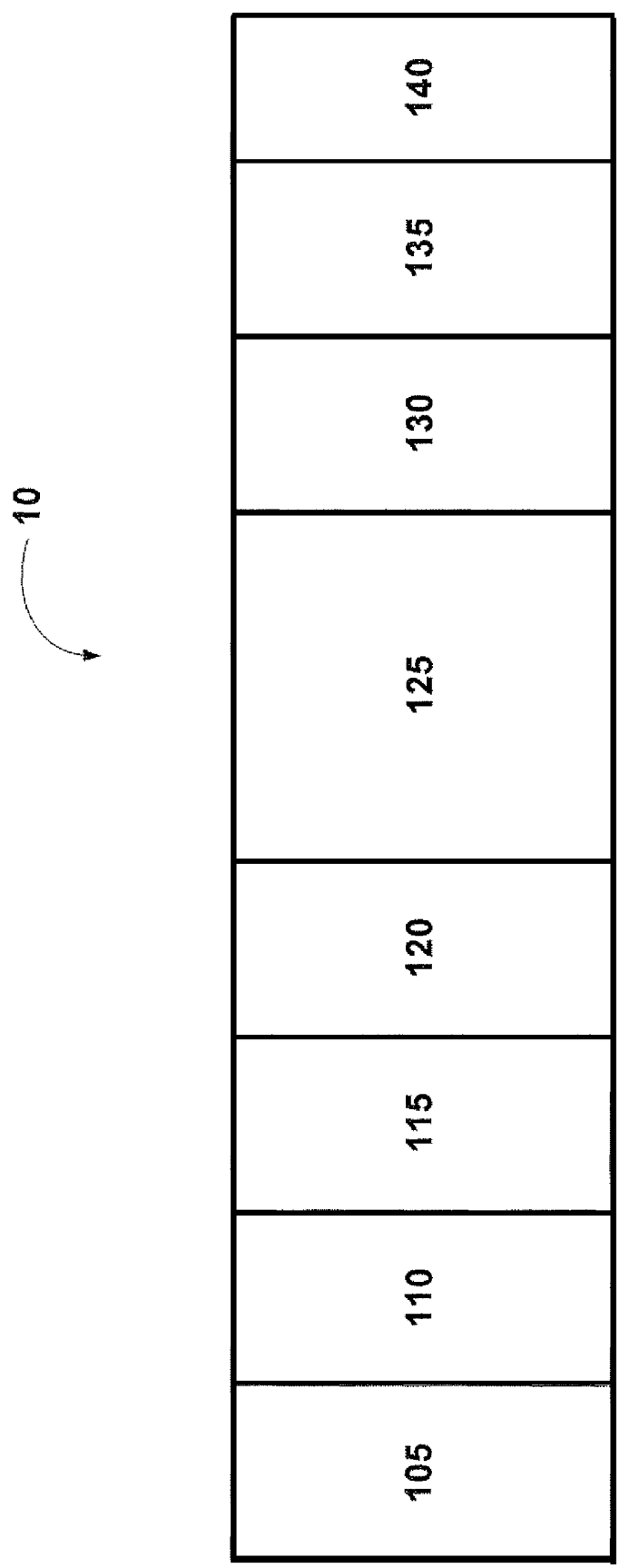
FIG. 1 illustrates the format of an Ethernet packet.

The format of an Ethernet packet 10 is illustrated in FIG. 1, wherein:
Field 105 comprises Start Symbols of the packet, signifying the beginning of the packet;
Field 110 comprises a Preamble, which serves as a synchronizing sequence to allow the physical signaling sublayer to synchronizes itself to the received frame (i.e., to the Ethernet packet);
Field 115 comprises a Start Frame Delimiter (SFD), which is a special sequence of 10101011, signifying the start of the information carrying part of the packet;
Field 120 comprises a Header, which combines a destination address of the receiver, a source address of the transmitter, and an indicator of the length of the data field of the packet;
Field 125 is a variable length Data field of between 46 and 1500 bytes (if necessary, the Data field 125 is padded with all zeros, so that the length of this field is at least 46 bytes);
Field 130 is a 4-byte frame check sequence (FCS) of the packet, comprising a cyclic redundancy check value used to verify the integrity of the received packet;
Field 135 comprises Stop Symbols that signify the packet's end; and
Field 140 is an inter-packet gap interval (IGP).

Strictly speaking, the IGP 140 is not part of the packet. Rather, the IGP 140 is a time gap or a buffer zone between consecutive packets on the network. Nevertheless, because the Ethernet standard specifies handling of this field, it is illustrated in FIG. 1.

Figure 2:
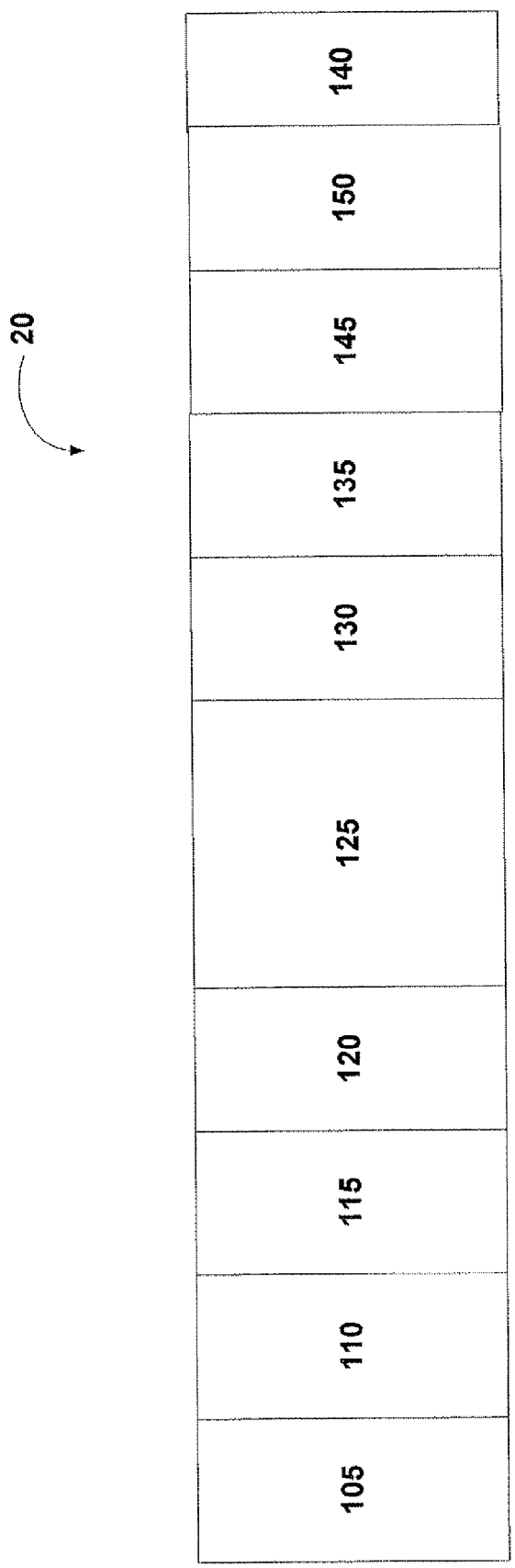
FIG. 2 illustrates the format of an Ethernet packet with FEC encoding in accordance with the present invention.

FIG. 2 illustrates an Ethernet packet 20 encoded by the representative embodiment in accordance with the present invention. The actual FEC coding used is of the systematic block coding kind. Block coding means coding of blocks of k information source symbols into blocks of code symbols or codewords of n symbols. (A symbol can be a bit, a byte, a 16-bit word, or any other binary or non-binary character or string of characters.) As redundancy implies, n>k. The rate of such code is defined as R=k/n.

A systematic block code is a code where the information symbols of a block to be coded are carried into the corresponding codeword, and the parity-check symbols are added to the codeword. Thus, the information symbols remain visible after the block is coded. Consider the encoding of $(D_0, D_1, \ldots D_{k-1})$ information symbols is into a codeword comprising $(C_0, C_1, \ldots C_{n-1})$ symbols. If a systematic code is used, then k elements of the codeword will be identical to the $(D_0, D_1, \ldots D_{k-1})$ information symbols. For example, $C_j$ could be equal to $D_j$ for $0 \leq j \leq k-1$; for $k \leq j \leq n-1$, $C_j$ would then equal to the parity-check symbols of the codeword. Note that any linear code can be converted into a systematic code through a linear transformation. The code's characteristics are preserved after the transformation.

Fields 105, 110, 115, 120, 125, 130, 135, and 140 of the packet 20 in FIG. 2 are similar to the like designated fields of the packet 10 in FIG. 1. In addition, two new fields are present. Parity-check field 145 comprises parity-check bytes resulting from encoding of an information block in the packet 20. The information block can include, for example, the Preamble field 110, the SFD field 115, the Header field 120, the Data field 125, and the FCS field 130. In the representative embodiment, all five of these fields are block encoded. Field 150 is a second Stop Symbols field, similar to the Stop Symbols field 135; it delimits the Parity-check field 145.

In the course of FEC encoding of the packet 20, the fields to be encoded are divided into k-byte frames, each of which is FEC encoded into an n-byte frame/codeword. The resulting (n-k) parity-check bytes per frame are gathered together in the Parity-check field 145. Note that for Reed-Solomon codes, discussed in more detail below, (n-k)=2t, with t being the correction length of the code, i.e., t is the highest number of guaranteed correctable errors per received frame. (The Hamming distance of the code being equal to 2t+1.)

The last frame (or possibly the entire single-frame packet) may be shorter than k bytes. In this case, the short frame is zero padded to k bytes, and 2t parity-check bytes are produced for this short frame in the usual manner. Preferably, the padding (zero) bytes are not transmitted. The padding thus becomes virtual zero padding. The short frame may be coded with a different FEC code, either constant or variable, according to its length. When all frames are of equal length, the additional number of parity-check bytes for an L-byte long packet is $$2 \cdot t \cdot \frac{L}{k}.$$

Later in this document we will describe a coder and decoder implementations capable of maintaining line rate coding and decoding with short frames for the Reed-Solomon (255, 255-2t, t) codes; we will also describe a method for balancing the rate loss variation resulting from short frames.

Preferably, the parity-check bytes of field 145 represent FEC block encoding of all five fields 110, 115, 120, 125, and 130, but this is not a requirement of the invention. In other words, any one or more of the fields 110, 115, 120, 125, and 130 can be treated as a block for application of the FEC encoding scheme.

Although the specific type of systematic block encoding is not crucial to the operation of the invention, in the representative embodiment the encoding scheme uses a Reed-Solomon code. Reed-Solomon codes, based on mathematics of Galois fields, are important because efficient decoding algorithms for them exist and are known. For a description of these codes see, for example, U.S. Pat. No. 4,142,174 to Chen et al.; U.S. Pat. No. 4,567,594 to Deodhar; and I. S. Reed and G. Solomon, *Polynomial Codes Over Certain Finite Fields*, 8 J. SOC'Y INDUS. APPLICATION MATHEMATICS 300, 300-04 (1960). (The Chen patent, the Deodhar patent, and the cited article are filed together with this document and are hereby incorporated by reference as if fully set forth herein.) Additional description of coding and decoding schemes may be obtained from SHU LIN & DANIEL J. COSTELLO, JR., ERROR CONTROL CODING: FUNDAMENTALS AND APLICATIONS, (Prentice-Hall, Inc. 1983). In the preferred embodiment the Reed-Solomon code used is a $GF(2^8)$–(255, 255-2t, t) code. In this notation, n=255, k=(255-2t), and t, as was mentioned above, is the maximum number of correctable errors in an encoded block.

The use of a systematic block code with parity-check byte gathering makes the first part of the FEC-encoded packet 20 (comprising the fields 105, 110, 115, 120, 125, 130, and 135) practically indistinguishable from similar fields in the non-encoded packet 10 of FIG. 1. Thus, a legacy network element observing the packet 20 on an Ethernet network would transparently receive or discard the packet, based on the destination address in the packet's preamble. If the legacy network element receives the packet 20, it can simply ignore the parity-check bytes of the packet. If the transmitter of packets knows that the receiver is a legacy network element that does not decode the received packets, preferably the packets is not encoded to avoid the rate loss associated with encoding. Similarly, even if a receiving network element is capable of FEC decoding but does not need the improved BER because of the architectural parameters of the network, such as the proximity of the receiving element to the transmitter, the packets sent from the transmitter to the receiving element are preferably not encoded. In fact, the decision to encode packets can be made dynamically, for instance, after a pair of network elements exchange a sufficient number of packets to calculate the bit error rates in both directions.

In one embodiment of the invention, several FEC codes are used on the same Ethernet network, or even by the same network element of the network. For example, a transmitter can switch between or among multiple FEC codes according to a preprogrammed schedule, based on the length of the encoded packet, or as determined through dynamic information exchange between the transmitter and a receiver. In the last case, for example, the specific FEC code can be negotiated between the receiver and the transmitter during a registration process.

Framing and parity-check byte gathering can add to the delay on the receiver side because the decoder needs to receive the entire packet before it can decode the FEC code. The additional delay is thus at least one packet length. In a Gigabit Ethernet network the delay associated with a long packet is approximately $$1500(bytes/packet)*8(bits/byte)*1(nsec/bit)=12\ \mu Sec.$$

The receiver can, of course, decide not to decode the packet. For example, the decision not to decode can be made after the FCS of the packet indicates that the packet has not been corrupted.

As noted above, rate loss resulting from FEC encoding is incurred only for the encoded packets. The network elements that do not need the BER improvement or that are not capable of FEC encoding or decoding, need not suffer from the associated code rate loss. Note that the FEC framing described in this document enables the FEC-capable and non-FEC-capable network elements to share the same network.

Figure 3:
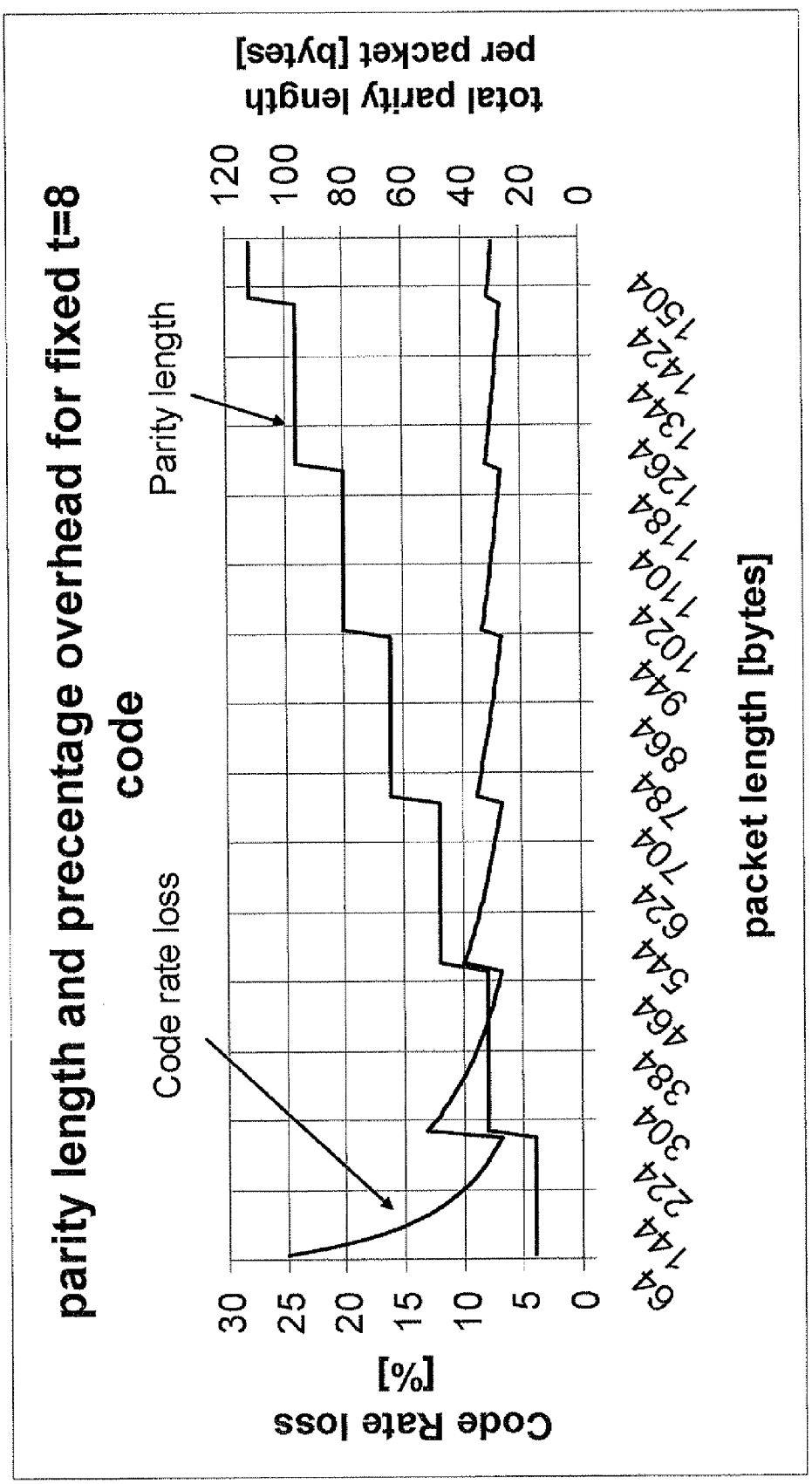
FIG. 3 is a graph of code rate loss versus packet length for packets encoded with Reed-Solomon (255, 239, 8) code.

Actual code rate loss depends on the packet length and the redundancy of the FEC code. FIG. 3 shows a plot of code rate loss versus packet length for packets encoded with Reed-Solomon (255, 239, 8) code. As will be discussed below, actual rate loss can be improved by transmitting the parity-check bytes during the inter-packet gap interval.

Figure 4A:
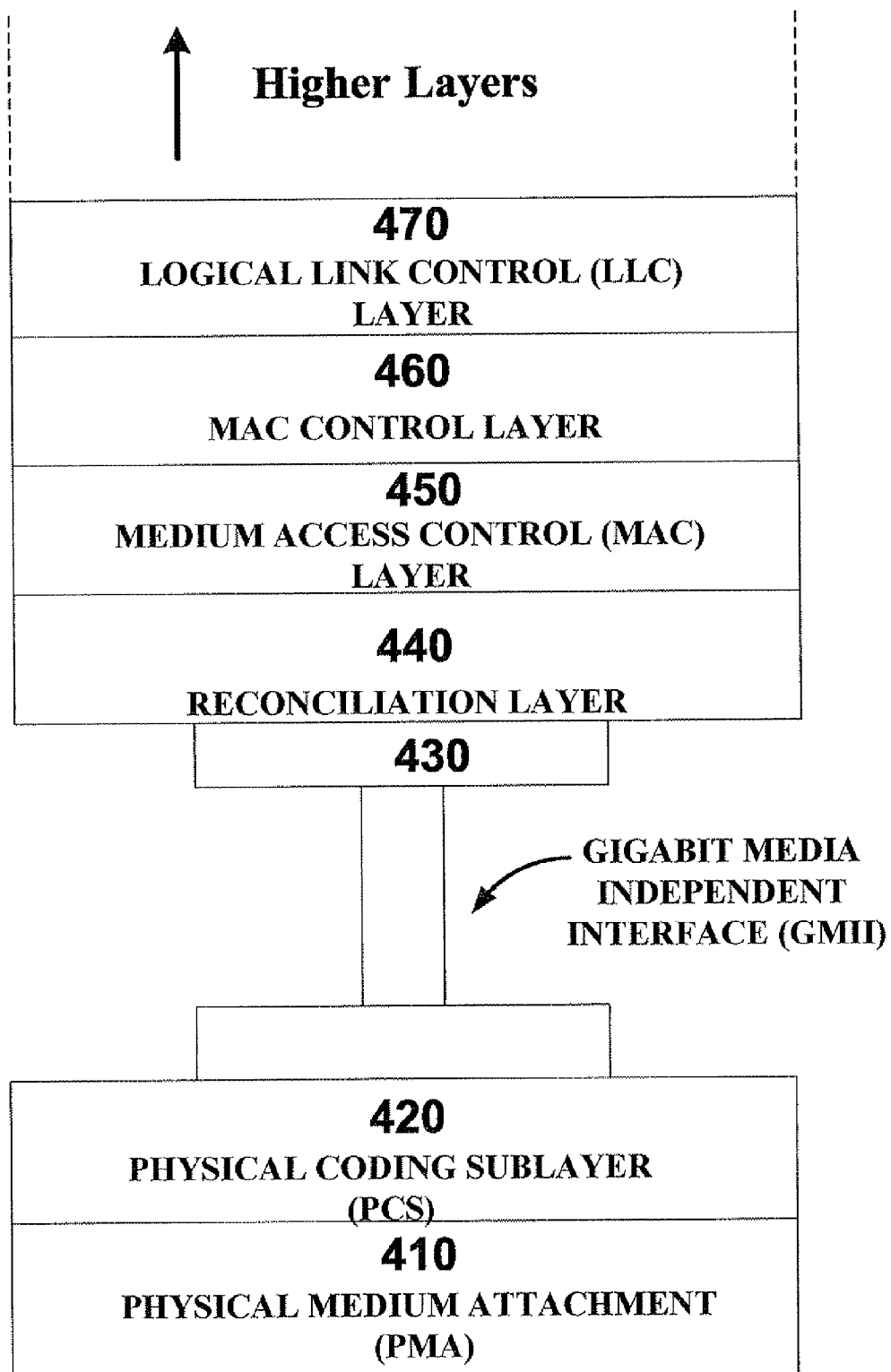
FIG. 4a illustrates a layering diagram of an Ethernet network element.
Figure 4B:
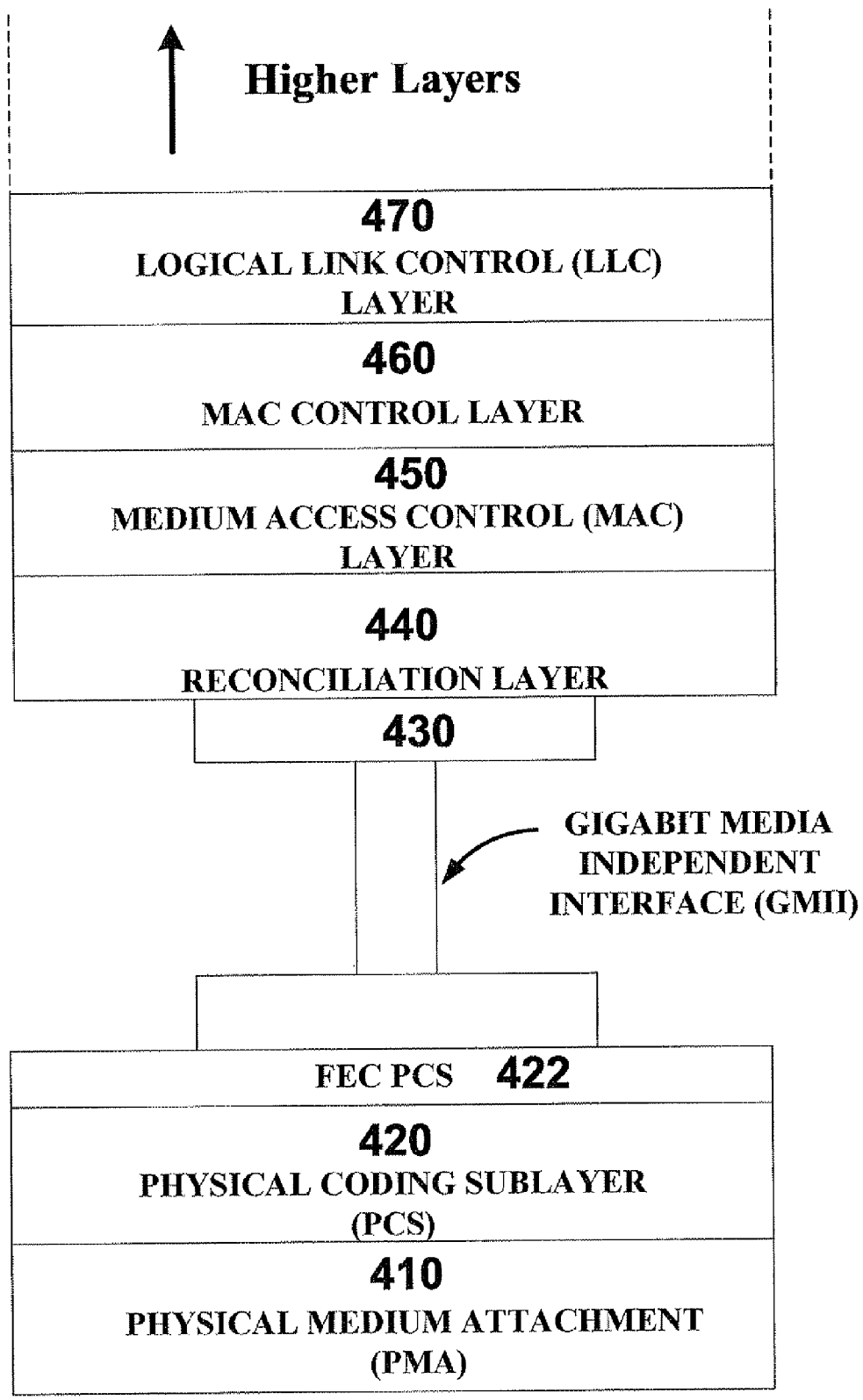
FIG. 4b illustrates a layering diagram of an Ethernet network element in accordance with the present invention.

FIG. 4a is a layering diagram of an Ethernet network element. (The various abbreviations appearing in the Figure are also defined in the IEEE 802.3 specification.) FIG. 4b is a layering diagram of an Ethernet network element in accordance with the present invention. (Like numbers in FIGS. 4a and 4b designate identical or similar elements.) Note the addition of an FEC component 422 to the physical coding sublayer (PCS) 420 and the other basic layers illustrated in FIG. 4a. The FEC component 422 is optional in the sense that the network element needs to employ it only when transmitting or receiving FEC-coded packets; the component 422 is transparent to non-FEC-coded packets.

In the representative embodiment, the FEC coding is implemented above the physical coding sublayer (PCS) 420 because the PCS line code (8B/10B in 1000BaseX) is used to maintain physical medium dependent (PMD) modulation coding functionality and to maintain the compatibility of the transmitted packets with the non-FEC-capable network elements. Therefore, during transmission the FEC encoder comes before the line code encoder (e.g., an 8B/10B encoder); during reception the FEC decoder comes after the decoder (e.g., the 8B/10B decoder).

Because FEC encoding decreases the payload rate of the encoded packets, both receivers and transmitters should have rate adaptation mechanisms to match their corresponding medium access control (MAC) and physical layer (PHY) rates. Rate adaptation methods that can be used during transmission include, for example, IPG stretching at the MAC layer. In this open-loop method, the MAC extends the IPG at the end of the packet in linear proportion to the packet's length. The number of Idle bytes inserted is determined per packet, according to the FEC code rate and the packet's length.

Another transmitter-side rate adaptation method uses a control signal from the PHY to the MAC to enable and disable data transmission in accordance with PHY's ability to transmit new data bytes. The control signal may be, for example, the CRS or COL signal. The PHY asserts or negates the control signal to allow the MAC to transfer data to the PHY only when the PHY can accept the data. When the PHY transmit buffer is full, for example, the PHY directs the MAC not to transmit new bytes until some data is released from the PHY into the physical channel. Only then MAC transmission is enabled. Thus, this method relies on feedback control and is a closed-loop method.

At the receiver, rate adaptation can be performed by inserting idle bytes from the PHY to the MAC, instead of the FEC residual data. The FEC residual data includes, for example, the parity-check bytes, and extended start and stop sequences discussed below.

A non-FEC network element receiving an FEC packet should detect the packet correctly. For this network element, the parity-check bytes constitute additional data, detected at the regular physical coding sublayer (PCS) in a False_carrier_detect mode (RX_ER is asserted, RX_DV is de-asserted). The False_carrier_detect mode of the PCS layer is ignored by the Reconciliation layer, and the MAC does not receive the parity-check bytes. In Table 1, below, we present a state table of a PCS driven by the input of an FEC-encoded Ethernet packet according to the framing of the representative embodiment described above. The table shows the output of the PCS of a non-FEC capable Ethernet network element receiving a stream of such data. The notations used in this and other similar tables of this document are defined in the IEEE specification, e.g., in chapter 36 of the specification, which describes the physical coding sublayer. The notations are known to those skilled in the art.

TABLE 1

FEC coded packet going through non-FEC PCS receive state machine

| Comments | 10B stream | Carrier Detect | Receiving | RX_DV | RX_ER | RXD<7:0> |
|---|---|---|---|---|---|---|
| IDLEs | /IDLE/ | | FALSE | FALSE | FALSE | RUDI(/I/) |
| Special | /R/R/ | TRUE | TRUE | | TRUE | 0000 1110 |
| Packet start | /K28.5/D5.6/ | FALSE | FALSE | | FALSE | RUDI(/I/) |
| Packet Start | /S/ | TRUE | TRUE | TRUE | FALSE | 0101 0101 |
| Data | /D/D/ | (All error states as before) | | | FALSE | DECODE[/x/] |
| Packet End | /T/R/K28.5/ | | FALSE | FALSE | FALSE | |
| Special Packet end | /D21.2/ | FALSE | FALSE | | FALSE | RUDI(/I/) |
| | /T/R/ | TRUE | TRUE | | TRUE | 0000 1110 |
| FEC parity | /D/D/ | TRUE | TRUE | | TRUE | 0000 1110 |
| Special parity end | /T/R/ | TRUE | TRUE | | TRUE | 0000 1110 |
| | /K28.5/D21.2/ | FALSE | FALSE | | FALSE | RUDI(/I/) |
| | /T/R/ | TRUE | TRUE | | TRUE | 0000 1110 |
| IDLEs | /IDLE/ | | FALSE | FALSE | FALSE | RUDI(/I/) |

The Ethernet standard uses several symbols that have special meanings. For example, special symbols exist to demarcate packet start and stop boundaries. Another symbol with a special meaning is the comma sign, used for octet synchronization. In the representative embodiment, these symbols are not FEC-encoded. Thus, their functionality, which may be needed before FEC decoding, is preserved. The lack of FEC encoding also means that these special signals do not benefit from the BER improvement resulting from the FEC encoding. It may be desirable to decrease the probability of error during detection of these symbols by means other than FEC encoding.

One method to bring about the decrease in the error rate of the special symbols is to extend the start and stop symbols to some short sequences of 10B. These sequences may be correlated during detection, thereby reducing the error rate of the special symbols. To remain compatible with the non-FEC network elements, the extended sequences should maintain the False_carrier_detect mode in the PCS layer, and the False_carrier_detect mode should be ignored by the Reconciliation layer.

An example of such an enhanced "Start of Packet" sequence may be as follows:
 -/S_FEC/-/R/R/K28.5/D5.6/S/.

An example of an enhanced "Stop of Packet" and "Stop_of_parity_check_bytes" sequences may be as follows:
 -/T_FEC/-/T/R/K28.5/D21.2/T/R/.

The Comma symbol for octet synchronization may be used as is, because it is repeated many times, making the probability of its false detection or non-detection low.

Figure 5:
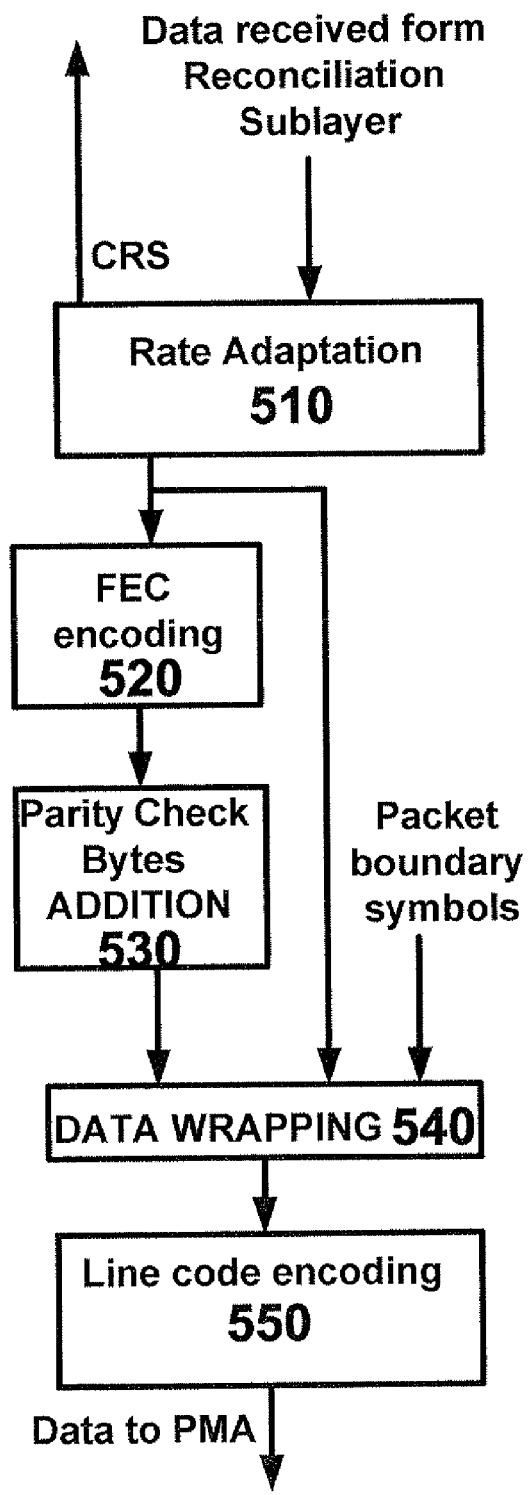
FIG. 5 illustrates a data flow diagram in the transmit path of an FEC PCS sublayer.
Figure 6:
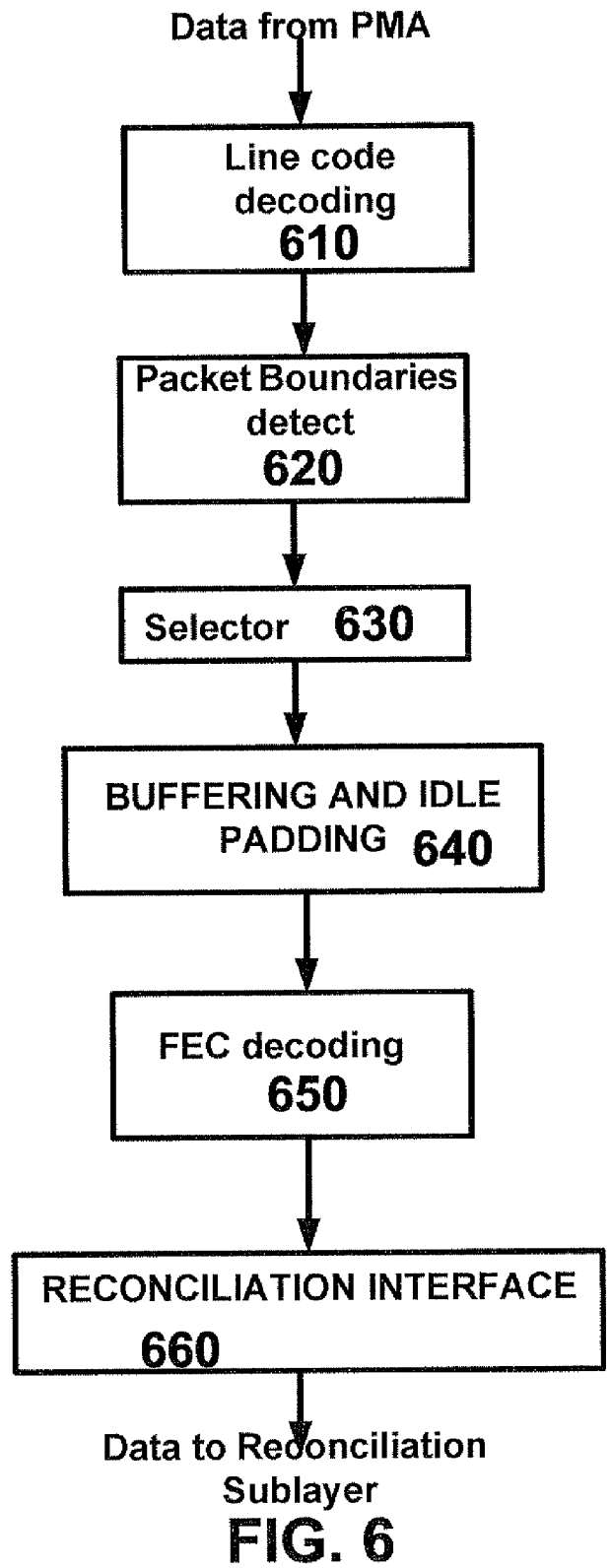
FIG. 6 illustrates a data flow diagram in the receive path of the FEC PCS sublayer.

FIGS. 5 and 6 illustrate data flow diagrams in the transmit and receive paths, respectively, of the FEC PCS component 422. In the transmit path, a rate adaptation mechanism is applied to the data received from the Reconciliation layer in step 510. The data is then encoded by an FEC (n, k, t) encoder at step 520, and parity-check bytes are added to the data at step 530. At step 540, a data wrapper moves the parity-check bytes to the end of the packet, and adds start and stop symbols. Next, at step 550, a line code encoder (e.g., 8B/10B encoder) encodes the packet for transmission and transfers the packet to the physical medium attachment (PMA) interface.

In the receive path, data received from the PMA interface undergoes line code decoding (e.g., 8B/10B decoding) in step 610. A data arbitrator then detects packet boundaries in step 620. At step 630, the data is separated into parity-check bytes and data bytes for each FEC frame. At step 640 idle bytes are padded, replacing the additional FEC bytes, and the frames are buffered in a packet delay buffer until an entire packet is received. FEC decoder is applied to the buffered packet in step 650. Finally, the FEC decoded packet is handed over to the Reconciliation layer interface at step 660.

Figure 7:
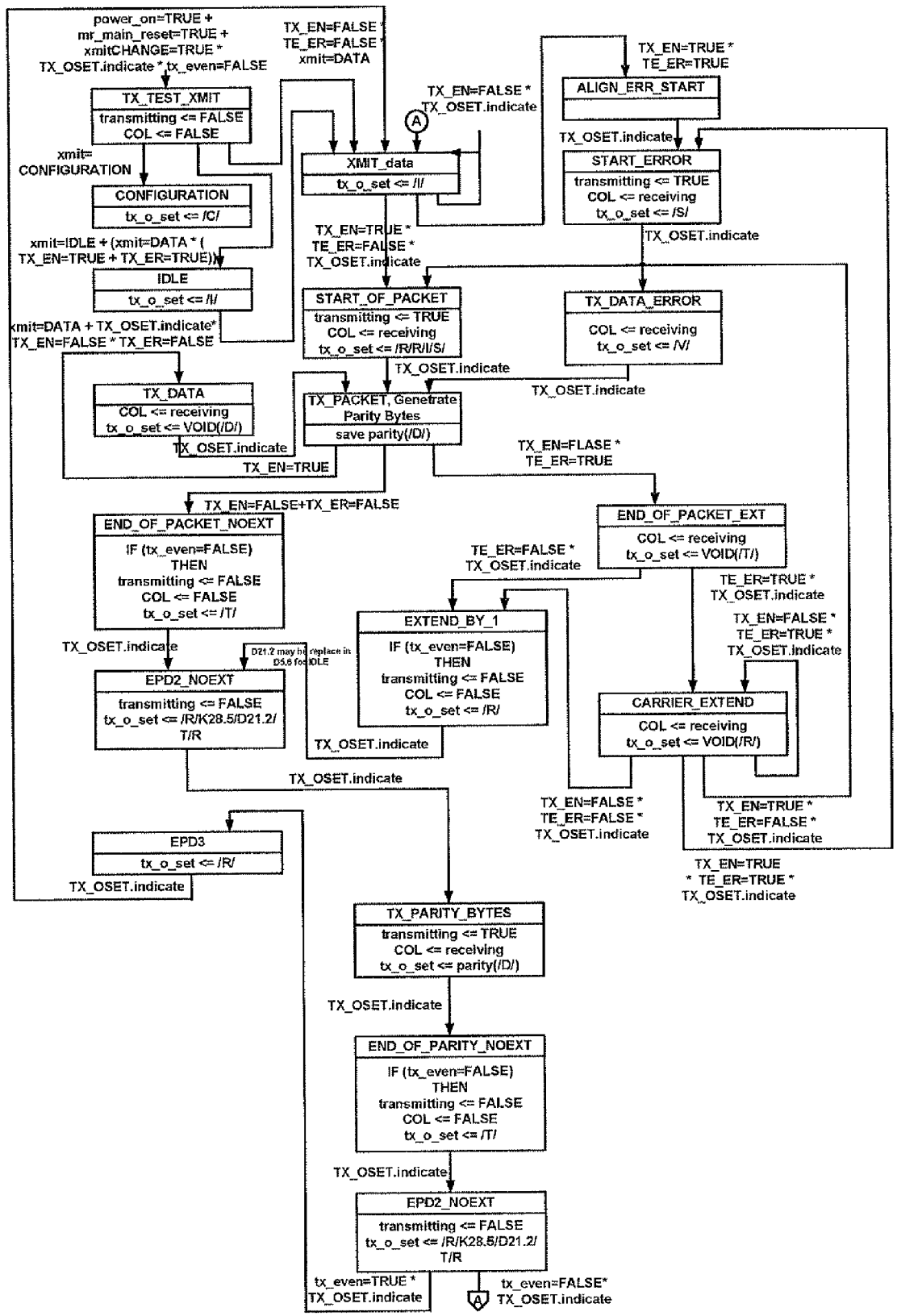
FIG. 7 illustrates one implementation of a transmit ordered_set state machine of a physical coding sublayer of an Ethernet network element in accordance with the present invention.

FIG. 7 illustrates an implementation of a transmit ordered_set state machine of an FEC-enabled Ethernet PCS. Ordered_sets, defined in the IEEE 802.3 standard, generally provide for the delineation of a packet and synchronization between the transmitter and receiver circuits at opposite ends of a link. They comprise a single special code-group or combinations of special and data code-groups. Ordered_sets that include a/K28.5/code-group provide the ability to obtain bit and code-group synchronization and establish ordered_set alignment.

Figure 8A:
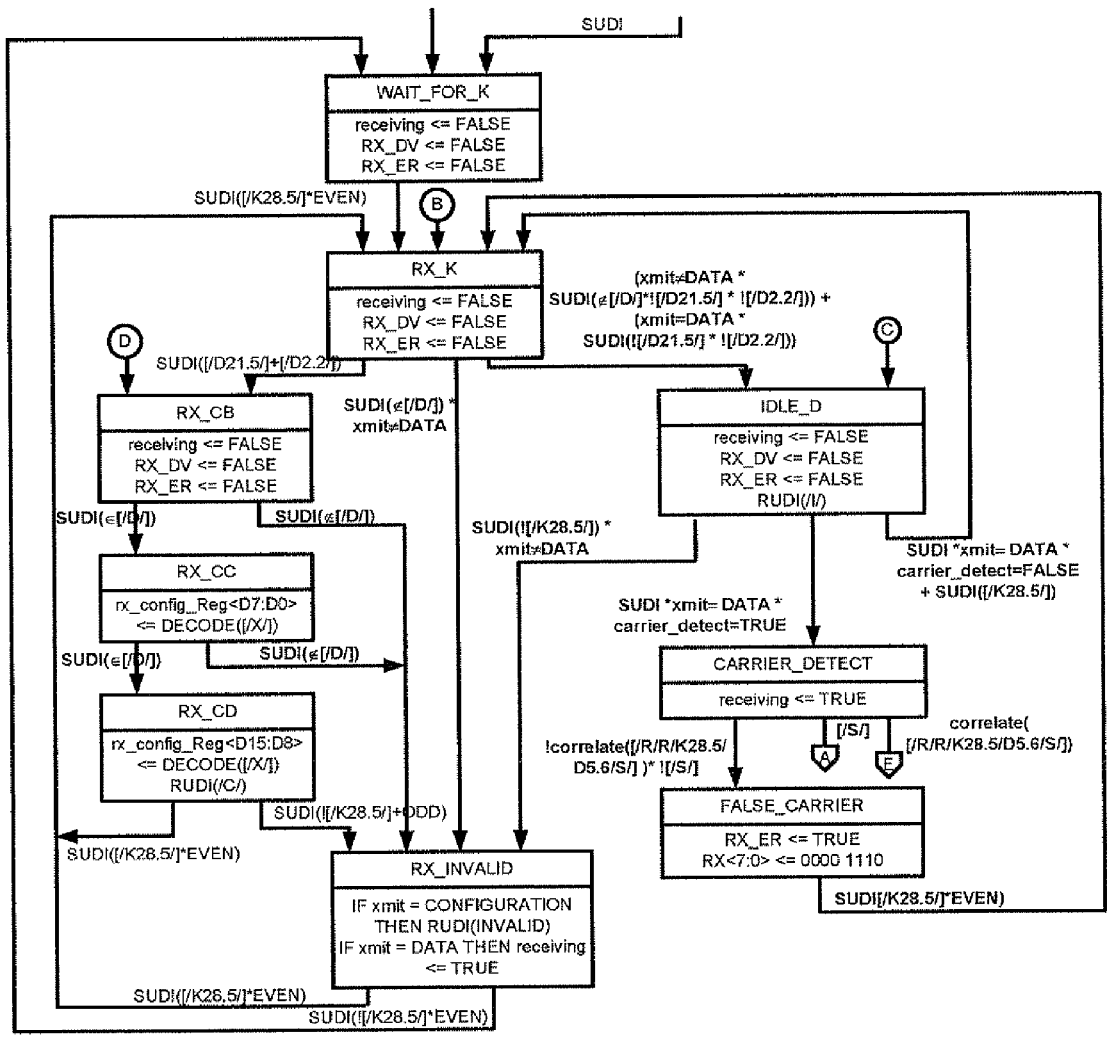
FIGS. 8a, 8b, and 8c illustrate an FEC receive state machine integrated in a PCS receive state machine of an Ethernet network element in accordance with the present invention.
Figure 8B:
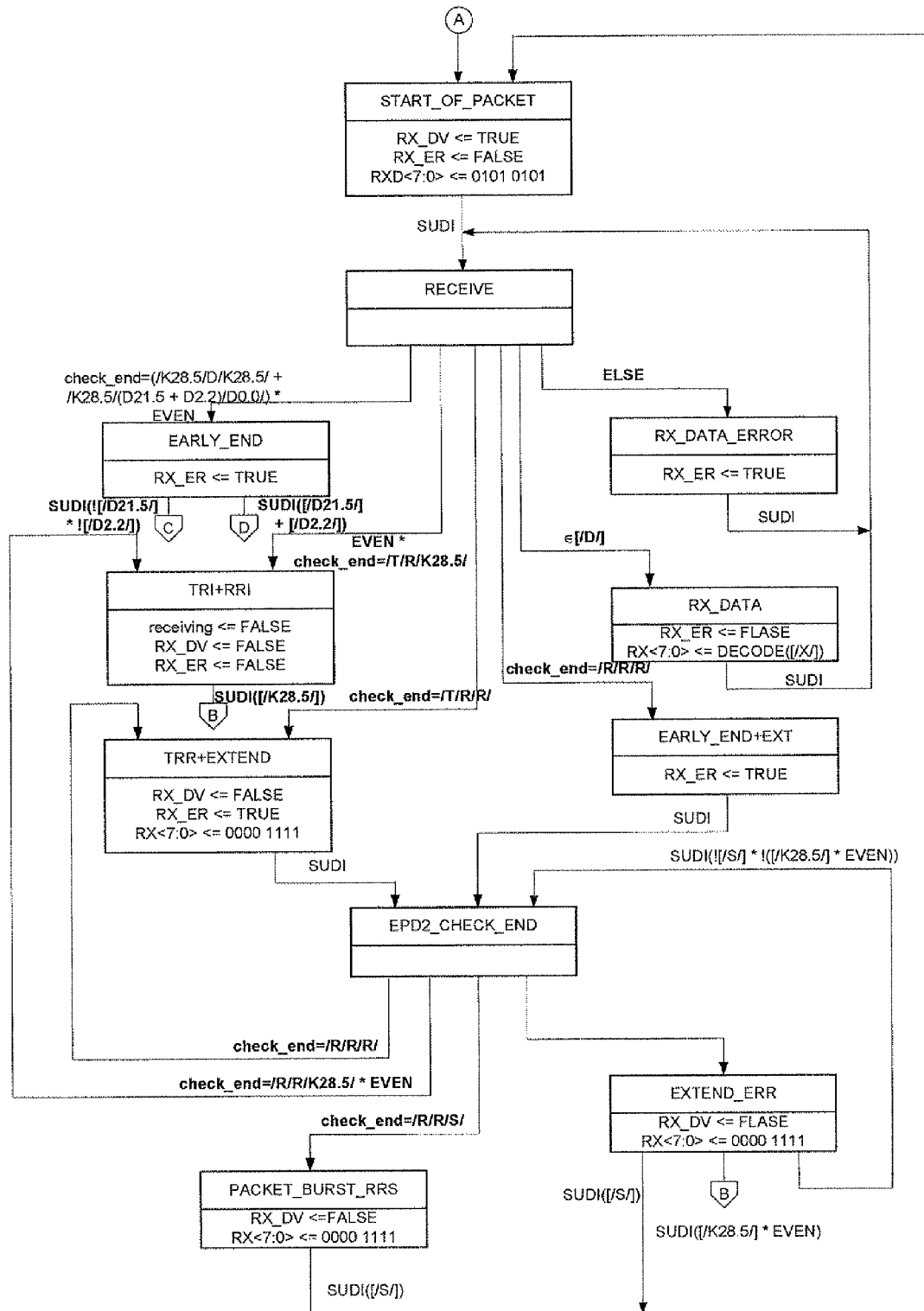
Figure 8C:
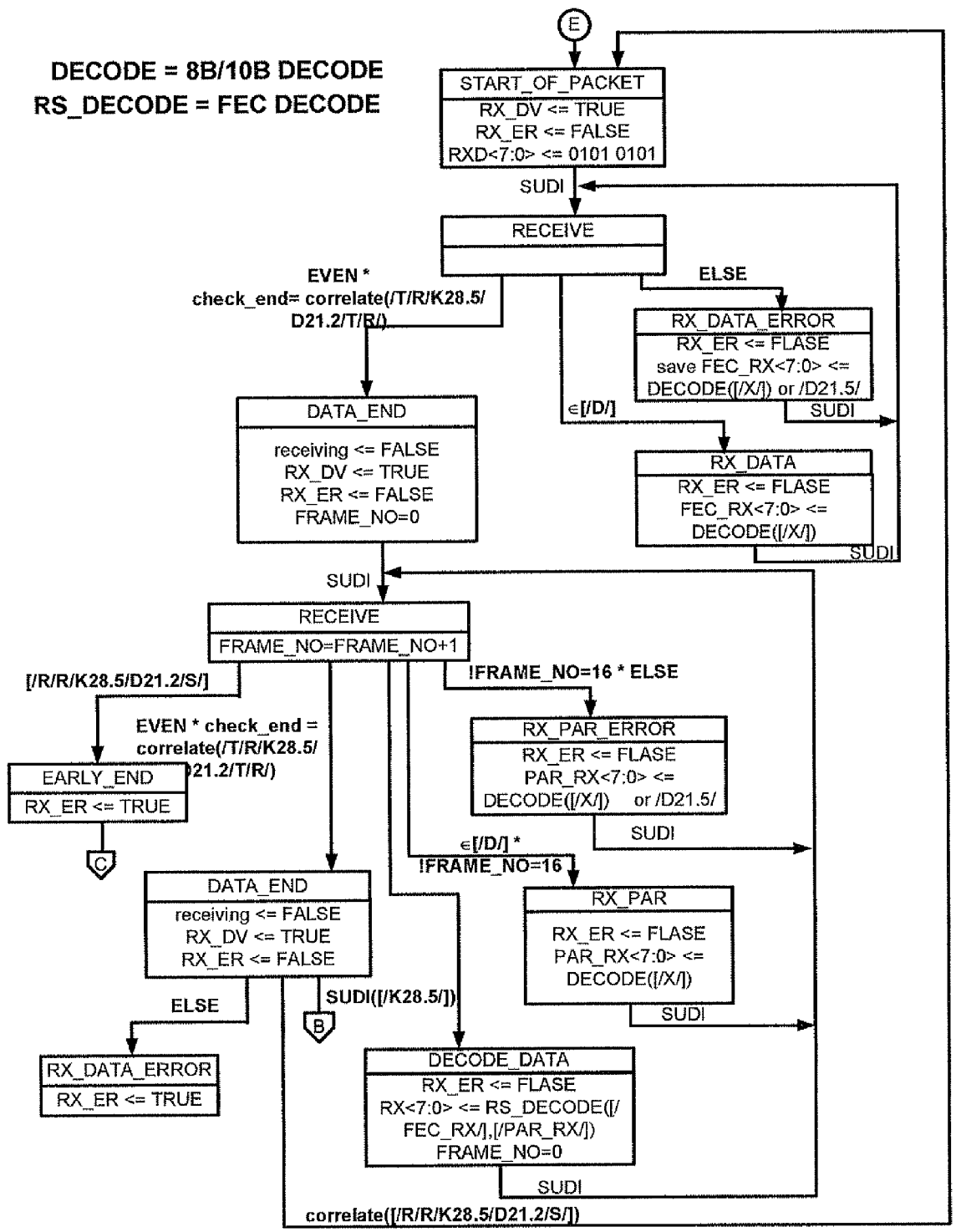

FIGS. 8a, 8b, and 8c illustrate an implementation of an FEC receive state machine integrated in a PCS receive state machine of a network element in accordance with the present invention. The state machine of FIGS. 8a-c enables a network element to receive both FEC-encoded and non-FEC-encoded Ethernet packets. Because of the distinctions between FEC-encoded and conventional Ethernet packet formats, an FEC-capable network element can detect and interpret a non-FEC-encoded packet. The PCS synchronization state machine should be adapted so that it does not reflect errors at the higher BER of the received (pre-FEC) packets.

Table 2 below is a state table of an FEC-enabled PCS driven by the input of an FEC-encoded Ethernet packet in accordance with the framing of the preferred embodiment described above. The table shows the output for the FEC PCS layer receiving a stream of data for every word.

TABLE 2

FEC coded packet going through FEC PCS receive state machine

| Comments | 10B stream | Carrier Detect | Receiving | RX_DV | RX_ER | RXD<7:0> |
|---|---|---|---|---|---|---|
| IDLEs | /IDLE/ | | FALSE | FALSE | FALSE | RUDI(/I/) |
| Special Packet start | /R/R/K28.5/D5.6/S/ | TRUE | TRUE | TRUE | FALSE | 0101 0101 |
| Data | /D/D/ | (All error states as before) | | | FALSE | DECODE[/x/] |
| Special Packet end | /T/R/K28.5/D21.2/T/R/ | | FALSE | FALSE | FALSE | RUDI(/I/) |
| FEC parity | /D/D/ | TRUE | TRUE | | FALSE | DECODE([/x/] |
| Special parity end | /T/R/K28.5/D21.2/T/R/ | | FALSE | FALSE | FALSE | RUDI(/I/) |
| IDLEs | /IDLE/ | | FALSE | FALSE | FALSE | |

The use of FEC coding to improve BER or to increase link budget is not limited to new Ethernet devices. Indeed, a legacy network element can be enhanced by retrofitting it with an external FEC-capable adaptation device having a conventional Ethernet interface. The external adaptation device is essentially an FEC coder/decoder interposed between the legacy network element and the Ethernet network. Upon reception of an FEC-encoded packet from the network, the external adaptation device detects the packet's boundaries, decodes the FEC code, and insert idle bytes in the place of the residual FEC data (i.e., the parity-check bytes and start and stop symbol sequences). When the legacy network element transmits a packet, the external adaptation device detects the packet's boundaries (i.e., start and stop symbol sequences of the packet), calculates parity-check bytes and adds them at the end of the packet, and creates new start and end of packet symbol sequences.

The external device also handles rate adaptation between the Ethernet network and the non-FEC legacy device during data transmission. Rate adaptation may be performed with a buffer, for example, a first-in first-out device (FIFO). As a long term rate adaptation mechanism, the external device may use Ethernet flow control signals of the conventional Ethernet interface, such as the PAUSE signal, to enable and disable data flow from the legacy network. Thus, the external device can stop the data flow from the legacy network element to prevent overrunning the buffer.

We now proceed to describe a flexible method for line rate encoding and decoding of full-length and short frames with Reed-Solomon (n, k, t) code. The method is described for a general case encoder and decoder, without relying on a specific hardware implementation.

In the encoder, a shortened code is created when the frame to be encoded contains r valid data bytes, where r<k. The remaining k-r bytes are treated as 0 bytes and are not transmitted. Thus, the first k-r bytes of a short frame are 0 bytes and the last r bytes are data bytes. The coding scheme is in a systematic form of $g(x) \cdot m(x) = X^{n-k} \cdot D(x) + P(x)$, where $P(x)$ are the additional parity-check bytes. The parity-check bytes are derived by dividing the data of a frame with $g(x)$, where $g(x)$ is the generating polynomial for the Reed-Solomon code:

$$g(x) = \prod_{i=1}^{2t}(x - a^i) = \sum_{i=0}^{2t} g_i \cdot x^i.$$

The coded data, i.e., the codeword of a frame, is generally represented as follows for a full-length frame: $C = D_0, \ldots, D_{k-1}, P_0, \ldots, P_{n-k-1}$. For a short frame, the coded data is as follows: $C = 0, \ldots, 0, D_0, \ldots, D_{r-1}, P_0, \ldots, P_{n-k-1}$. Since $D(x)$ is in the degree of r−1, then the degree of $X^{n-k} \cdot D(x)$ is n−k+r−1. Because an encoder generally uses one cycle per degree of the polynomial, the encoder for a short frame may stop the encoding machine after r steps (i.e., cycles), after "virtually" following k−r steps with zero data.

At the decoder, let the received data be designated by $R = R_0, \ldots, R_n$, and the corresponding syndromes be derived from the following equations:

$$S_j = \sum_{i=0}^{1} e_1 \cdot a^{ij} = \sum_{i=0}^{n-1} R_i \cdot a^{ij} \ \forall \ j = 1, \ldots, 16.$$

For a short frame, the received data at the decoder is $R = R_0, \ldots, R_{n-k+r-1}$, and the syndromes are calculated as follows:

$$S_j = \sum_{i=0}^{n-1} R_i \cdot a^{ij} = \sum_{i=k-r}^{n-1} R_i \cdot a^{ij} = a^{(k-r-1)j} \cdot \sum_{i=0}^{n-k+r-1} R_i \cdot a^{ij} \ \forall \ j = 1, \ldots, 16.$$

Therefore, the decoder for a short frame may stop the syndrome calculation after r+2t steps; it does not need to perform n steps. The error position roots calculated in this way are valid for the last r+4t bytes only, and the error value correction is performed for r bytes only.

Thus, if an encoder or a decoder uses i clock cycles per step, then it will use i*255 clock cycles for a full frame of 255 bytes (having, for example, 239 information and 16 parity-check bytes). For line rate coding/decoding of a short frame of 64 information bytes, it will need to finish doing the coding or decoding in about i*(64+16) cycles. If a conventional encoder or decoder is used for the short frame, a faster clock is needed.

In contrast, the encoder and decoder described above can code and decode a short data frame in a shorter time period.

Thus, the encoder will need processing time proportional to (r+2t) bytes of the FEC frame. The decoder can perform syndrome calculation in (r+2t) cycles, the error position root calculation in r+4t cycles, and the error value correction calculation in r cycles.

Thus, the processing time for short frames is essentially proportional to the frame length. The encoder and decoder can therefore perform substantially line rate encoding and decoding, and clock acceleration for the short frames can be avoided.

Next, we describe flexible encoder and decoder, each capable of encoding or decoding, respectively, all (N, N−2t, t) Reed-Solomon codes with a variable $t \leq t_{max}$, with $t_{max}$ being the maximal t for a particular encoder or decoder. In a non-limiting embodiment of a transmitting node in accordance with the invention, N is equal to 255. The flexible encoder and decoder have complexity associated with $t_{max}$.

Recall that, in the polynomial representation, the coding scheme is in the systematic form of $g(x) \cdot m(x) = X^{n-k} \cdot D(x) + P(x)$. In this equation, P(x) represents the additional parity-check symbols (bytes in an octet-based code), and g(x) represents the generator polynomial. The parity-check bytes are obtained by dividing the data with g(x). For a Reed-Solomon code, the generator polynomial is determined from the following formula:

$$g(x) = \prod_{i=1}^{2t} (x - \alpha^i).$$

Figure 9:
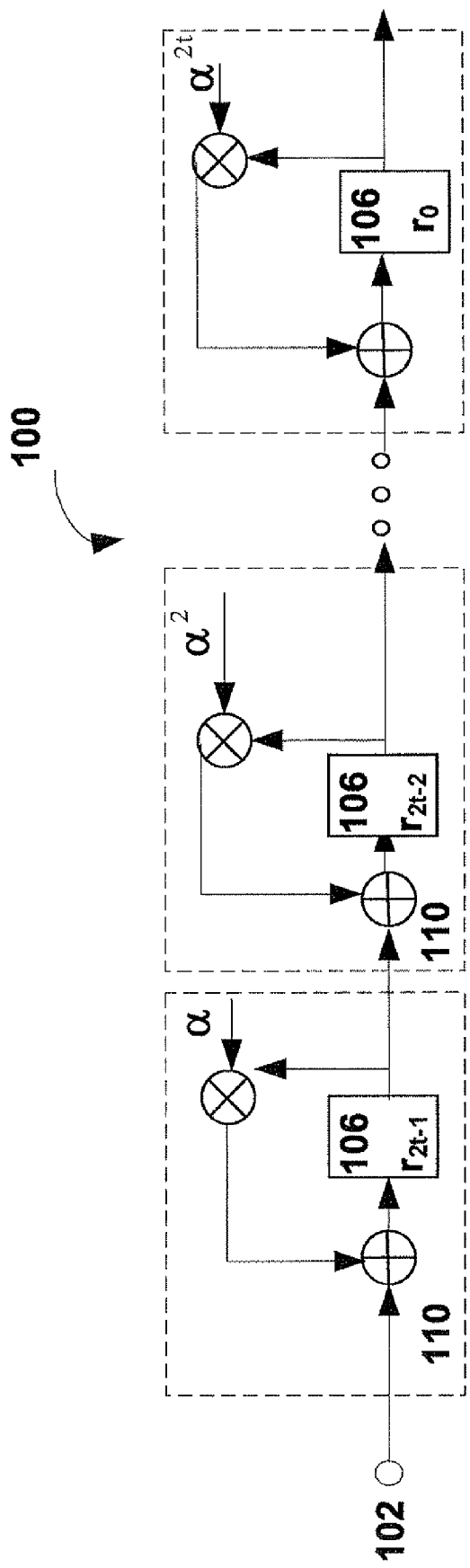
FIG. 9 illustrates a flexible encoder capable of encoding (N, N−2t, t) Reed-Solomon codes with a variable $t \leq t_{max}$, $t_{max}$ being the maximal t for a particular encoder.

We use encoder 100 illustrated in FIG. 9 to encode data bytes $D_0, \ldots, D_{k-1}$ to obtain a codeword in the form of $C = D_0, \ldots, D_{k-1}, P_0, \ldots, P_{n-k-1}$. The encoder 100 implements the division of the data polynomial by the generator polynomial g(x), with each element 110 dividing by $(x - \alpha)^i$.

Note that the degree of P(x) is (2 t−1). P(x) can be described by the following formula:

$$P(x) = r_0 + \sum_{i=1}^{2t-1} r_i \cdot \left( \prod_{j=1}^{i} (x - \alpha^j) \right).$$

During encoding, the first k data bytes are entered through an input port 102 into the register 106 of the encoder 100. Next, 2t zeros are entered into the register 106. These k+2t steps complete the dividing of the entire data with the elements of the generator polynomial g(x). The data remaining in the register 106 is $r_0, \ldots, r_{2t-1}$. The coefficients of P(x), i.e., the parity-check bytes, are derived from the $r_0, \ldots, r_{2t-1}$ data using the formula and the process shown below:

$$P(x) = r_0 + \sum_{i=1}^{2t-1} r_i \cdot \left( \prod_{j=1}^{i} (x - \alpha^j) \right) = \sum_{i=0}^{2t-1} P_i \cdot x^i.$$

At stage 0:

$$P(x) = r_0 + r_1(x - \alpha) + r_2(x - \alpha)(x - \alpha^2) +$$
$$\ldots + r_{2t-1}(x - \alpha) \ldots (x - \alpha^{2t-1}) = \sum_{i=0}^{2t-1} P_i \cdot x^i$$

Thus, we obtain: $r_{2t-1} = P_{2t-1}$.

At stage 1:

$$P(x) = r_0 + r_1(x-\alpha) + r_2(x-\alpha)(x-\alpha^2) + \ldots + r_{2t-1}$$
$$(x-\alpha) \ldots (x-\alpha^{2t-1}) = r_0 - r\alpha + x(r_1 - r_2\alpha)$$
$$(x-\alpha^2) + \ldots + x(r_{2t-2} - r_{2t-1}\alpha)(x-\alpha^2) \ldots$$
$$(x-\alpha^{2t-1}) + r_{2t-1}x^{2t-1}$$

Thus, we obtain $r_{2t-2} - \alpha r_{2t-1} = P_{2t-2}$. And the process is carried on until stage 2t−1.

In our flexible encoder these steps are performed by additional 2t stages moving the data backwards in the scheme, thereby implementing the functionality of multiplying by $(x - \alpha)^i$. The data received at the left side of the encoder (i.e., at the original input 102 of the encoder 100) are the P(x) coefficients.

The elements 110 are independent of each other. Therefore, to use the encoder 100 for $t' < t_{max}$, the elements are serially concatenated. The same encoder 100 can thus be used to encode any Reed-Solomon (255, 255−2t', t') code with $t' < t_{max}$.

We turn now to the description of the flexible decoder for $t' \leq t_{max}$. The flexible decoder, as most decoders, has three stages: (1) a syndrome calculation stage; (2) an error position finding stage; and (3) an error weight calculation stage.

If the data received by the decoder is designated by $R = R_0, \ldots, R_n$, then the syndromes can be derived from this formula:

$$S_j = \sum_{i=0}^{1} e_1 \cdot \alpha^{ij} = \sum_{i=0}^{n-1} R_i \cdot \alpha^{ij} \; \forall \; j = 1, \ldots, 2t.$$

From this formula it is easily observed that the syndrome equations for a $t' \leq t_{max}$ to decoder are exactly the same as the first 2t' syndrome equations of the $t_{max}$ decoder.

In calculating the error position roots, the syndromes are used to create the root polynomial. Because the syndrome equations are the same for the t' and $t_{max}$ decoders, the polynomials are also the same for the two decoders when using the first 2t' syndromes and zeros for the remaining syndromes. Therefore, the root positions are the same.

The error weight calculation is a function of the syndromes and of the root polynomial coefficients. Therefore, the error weight for the t' decoder is the same as for the $t_{max}$ decoder when using the 2t' syndromes and zeros for the remaining syndromes. The result of that is that the weight calculation would result in the same values for the two decoders.

Thus a Reed-Solomon (255, 255−2$t_{max}$, $t_{max}$) decoder can be used to decode any Reed-Solomon (255, 255−2t', t') code for $t' \leq t$.

The reader's attention is directed to all papers and documents that are filed concurrently with or previous to this specification and which are open to public inspection with this specification, and the contents of all such papers and documents are incorporated herein by reference.

We have described the invention and some of its features in considerable detail for illustration purposes only. Neither the specific embodiments of the invention as a whole nor those of its features limit the general principles underlying the invention. In particular, the broad scope of the invention is not limited to an optical network, to a particular Ethernet standard, to the specific state machine implementations described, or to a specific line code. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention, which function has been reserved for the following claims and their equivalents when considered in conjunction with the rest of this specification.

We claim:

1. A method for sending data packets from a transmitter to a receiver through a shared-medium digital transmission network, each packet ending in a stop symbols field delimiting the end of said each packet, the method comprising the steps of:

dividing data of at least a portion of said each packet into one or more frames;

applying a systematic forward-error-correction (FEC) block code to each frame of said each packet, said systematic FEC block code maintaining data symbols, of the frames, in an unaltered state and adding parity-check symbols; gathering together the parity-check symbols of the frames of said each packet in a parity-check field of said each packet;

modifying said each packet by adding, after the stop symbols field delimiting the end of said each packet, the parity-check field of said each packet, and adding, after the parity-check field of said each packet, a delimiter of the parity-check field of said each packet, thereby creating a plurality of modified packets; and transmitting the modified packets from the transmitter to the receiver through the shared-medium digital transmission network.

2. The method of claim 1, wherein the shared-medium digital transmission network is an Ethernet network.

3. The method of claim 2, wherein the data packets comprise a first data packet and a second data packet, and said applying step comprises the step of applying a first FEC block code to each frame of the first packet, and applying a second FEC block code to each frame of the second packet.

4. The method of claim 2, wherein the step of applying a systematic FEC block code comprises the step of applying a Reed-Solomon code to each frame of said each packet.

5. The method of claim 2, wherein the step of applying a systematic FEC block code comprises the step of applying a Reed-Solomon $GF(2^8)$–$(255, 255-2t, t)$ code to each frame of said each packet.

6. The method of claim 2, wherein the data of at least a portion of said each packet comprises a header field, a payload data field, and a frame check sequence field.

7. The method of claim 2, wherein the data of at least a portion of said each packet comprises a preamble field, a start frame delimiter field, a header field, a payload data field, and a frame check sequence field.

8. The method of claim 2, wherein: the frames include frames of a predetermined length L and short frames, having a variable frame length L', wherein said variable short frame length L' is less than said predetermined length L; and the step of applying a systematic FEC block code to each frame of said each packet includes the step of virtually zero padding the short frames.

9. The method of claim 8, wherein the step of applying a systematic FEC block code comprises a step for line rate encoding each short frame.

10. The method of claim 2, wherein the transmitter comprises a media-access-control (MAC) layer and a physical (PHY) layer, and said each packet is followed by an interpacket gap interval, the method further comprising the step of adapting transmission rate of the MAC layer to transmission rate of the PHY layer.

11. The method of claim 10, wherein the step of adapting transmission rate comprises the step of interpacket gap interval stretching in the MAC layer of the transmitter.

12. The method of claim 11, wherein the step of interpacket gap interval stretching comprises the step of extending interpacket gap interval at the end of said each packet in linear proportion to the length of said each packet.

13. The method of claim 2, wherein the receiver comprises a media-access-control (MAC) layer and a physical (PHY) layer, further comprising the steps of: receiving the transmitted packets at the receiver; and adapting reception rate of the MAC layer to the reception rate of the PHY layer.

14. The method of claim 13, wherein the step of adapting reception rate comprises the step of inserting idle symbols from the PHY layer to the MAC layer in place of parity-check symbols of the received packets.

15. The method of claim 14, wherein the step of adapting reception rate further comprises the step of asserting and negating a control signal to allow the MAC layer to transfer data to the PHY layer only when the PHY layer can accept the data.

16. The method of claim 15, wherein the control signal is a CarrierSense (CRS) signal.

17. The method of claim 15, wherein the control signal is a CollisionDetect (COL) signal.

18. The method of claim 2, further comprising the step of 8b/10b line coding of the modified packets before said transmitting step, wherein: said each packet comprises a start symbols field delimiting the beginning of said each packet; the transmitter comprises a media-access-control (MAC) layer and a physical (PHY) layer; and the modifying step comprises the step of extending the start symbols field and the stop symbols field of said each packet to short sequences of 10B that maintain a False_carrier_detect mode.

19. The method of claim 2, further comprising the step of 8b/10b line coding of the modified packets before said transmitting step, wherein: said each packet comprises a start symbols field delimiting the beginning of said each packet; the transmitter comprises a media-access-control (MAC) layer and a physical (PHY) layer; and the modifying step comprises a step for decreasing error rate of characters in the start symbols and stop symbols fields of said each packet.

20. The method of claim 2, further comprising the step of communicating packets between the transmitter and receiver to register the receiver with the transmitter and to determine the systematic FEC block code.

21. The method of claim 2, wherein the step of applying comprises the step of applying at least one systematic FEC block code to each frame of said packet, the method further comprising the step of selecting a systematic FEC block code for applying to the frames of said each packet based on the length of said each packet.

22. The method of claim 2, wherein the data of at least a portion of said each packet comprises a header field, a payload data field, and a frame check sequence field, the frame check sequence field of said each packet comprising a cyclic redundancy check value of said each packet, the method further comprising the steps of: receiving the modified packets at the receiver; reading the frame check sequence field of each modified packet received at the receiver; using the cyclic redundancy check in the frame check sequence field of said each modified packet received at the receiver to verify integrity of said each modified packet received at the receiver; if the cyclic redundancy check in the frame check sequence field of said each modified packet received at the receiver indicates that integrity of said each modified packet received at the receiver has been compromised, performing FEC decoding on said each modified packet received at the receiver.

23. A method for receiving data packets sent from a transmitter to a receiver through an Ethernet network, the receiver including a media-access-control (MAC) layer and a physical (PHY) layer, each packet ending in a second stop symbols field delimiting the end of said each packet, said each packet followed by an interpacket gap interval, said each packet including a parity-check field at the end of said each packet and before the second stop symbols field, said each packet including a first stop symbols field before the parity check field, said each packet including data in a data field preceding the first stop symbols field, the parity-check field of said each packet including parity-check symbols resulting from encoding frames of at least a portion of the data of said each packet with a systematic forward-error-correction (FEC) block code, the method comprising the steps of:
  receiving the packets at the receiver;
  FEC decoding each received packet; and
  changing a reception rate of the MAC layer to match a reception rate of the PHY layer.

24. The method of claim 23, wherein the step of changing comprises the step of inserting idle symbols from the PHY layer to the MAC layer in place of parity-check symbols of the received packets.

25. The method of claim 24, wherein the packets are encoded with a Reed-Solomon code.

26. A method for sending data packets from a transmitter to a receiver through an Ethernet network, the method comprising:
  a step for applying at least one systematic forward-error-correction (FEC) block code to data of the data packets to encode the data packets with parity-check symbols at the packet ends, special start symbols, and special stop symbols so that the encoded data packets do not cause media-access-control (MAC) layer errors when the encoded data packets are received at non-FEC-capable Ethernet-compliant network elements, thereby creating a plurality of encoded packets;
  and sending the encoded packets from the transmitter to the receiver through the Ethernet network.

27. A method according to claim 26, further comprising: receiving the encoded packets; and decoding the encoded packets.

28. A network element for sending data packets to a receiver through an Ethernet network, each packet ending in a stop symbols field delimiting the end of said each packet and followed by an interpacket gap interval, the network element comprising:
  a framer that divides at least a portion of said each packet into one or more frames;
  an FEC encoder that applies at least one systematic FEC block code to the frames, said at least one systematic FEC block code maintaining data symbols, of the frames, in an unaltered state and calculating parity-check symbols;
  a packet modifier that modifies said each packet by adding, after the stop symbols field delimiting the end of said each packet, the calculated parity-check symbols of the frames of said each packet, and by adding, after the calculated parity-check symbols of the frames of said each packet, a delimiter of the parity-check field of said each packet, thereby creating of modified packets; and
  a transmitter that transmits the modified packets to the receiver.

29. A network element according to claim 28, wherein said at least one systematic FEC block code comprises a first systematic FEC block code and a second systematic FEC block code, and the FEC encoder applies the first systematic FEC block code to frames of a first packet of the data packets and the second systematic FEC block code to frames of a second packet of the data packets.

30. A network element according to claim 28, wherein said at least one systematic FEC block code comprises a Reed-Solomon code.

31. A network element according to claim 28, wherein said at least one systematic FEC block code comprises a Reed-Solomon $GF(2^8)-(255, 255-2t,t)$ code.

32. A network element according to claim 28, wherein the portion of said each packet divided by the framer comprises a header field, a payload data field, and a frame check sequence field.

33. A network element according to claim 28, wherein the portion of said each packet divided by the framer comprises a preamble field, a start frame delimiter field, a header field, a payload data field, and a frame check sequence field.

34. A network element according to claim 28, wherein: the framer divides at least a portion of said each packet into frames of a predetermined length L and short frames, having a variable frame length L', wherein said variable short frame length L' is less than said predetermined length L; and the FEC encoder virtually zero pads the short frames.

35. A network element according to claim 28, further comprising: a media-access-control (MAC) layer; a physical (PHY) layer; and a rate adaptation mechanism that adapts transmission rate of the MAC layer to transmission rate of the PHY layer.

36. A network element according to claim 28, further comprising: a media-access-control (MAC) layer; a physical (PHY) layer; and a rate adaptation mechanism that adapts transmission rate of the MAC layer to transmission rate of the PHY layer by interpacket gap interval stretching.

37. A network element according to claim 28, further comprising: a media-access-control (MAC) layer; a physical (PHY) layer; and a rate adaptation mechanism that adapts transmission rate of the MAC layer to transmission rate of the PHY layer by linearly stretching an interpacket gap interval following said each packet in proportion to the length of said each packet.

38. A network element according to claim 28, further comprising:
  a media-access-control (MAC) layer;
  a physical (PHY) layer;
  an 8b/10b line encoder;
wherein: said each packet further comprises a start symbols field delimiting the beginning of said each packet; the packet modifier comprises a 10B extender that extends the start symbols field and the stop symbols field of said each packet to short sequences of 10B that maintain a False_carrier_detect mode.

39. A network element according to claim 38, further comprising means for implementation of a transmit ordered_set state machine of a physical coding sublayer.

40. A component of a physical coding sublayer of an Ethernet transmitter sending data packets to a receiver through an Ethernet network, each packet ending in a stop symbols field delimiting the end of said each packet, the component comprising:
   a forward-error-correction (FEC) encoder that divides at least a portion of said each packet into one or more frames and applies at least one systematic FEC block code to the frames, said at least one systematic FEC block code maintaining data symbols, of the frames, in an unaltered state and calculating parity-check symbols;
   a packet modifier that modifies said each packet by adding, after the stop symbols field delimiting the end of said each packet, the parity-check symbols of the frames of said each packet, and by adding, after the parity-check symbols of the frames of said each packet, a delimiter of the parity-check field of said each packet, thereby creating a plurality of modified packets; and
   a data wrapper that adds packet boundary symbols to the modified packets.

41. A component of a physical coding sublayer in accordance with claim 40, further comprising a rate adapter that receives the packets from a reconciliation sublayer of the Ethernet transmitter and adapts transmission rate of a MAC layer of the Ethernet transmitter to transmission rate of a physical (PHY) layer of the Ethernet transmitter.

42. A component of a physical coding sublayer in accordance with claim 41, wherein the at least one systematic FEC block code comprises a Reed-Solomon code.

43. A component of a physical coding sublayer in accordance with claim 41, further comprising a line code encoder that applies a line code to the packets with the added boundary symbols.

44. A component of a physical coding sublayer in accordance with claim 43, wherein: the FEC encoder divides at least a portion of said each packet into frames of a predetermined length L and short frames, having a variable frame length L', wherein said variable short frame length L' is less than said predetermined length L, and the FEC encoder virtually zero pads the short frames before applying the at least one systematic FEC block code to the frames.

45. A component of a physical coding sublayer in accordance with claim 44, wherein the FEC encoder comprises means for flexible encoding of (N, N−2t, t) Reed-Solomon codes with a variable t, t being less than or equal to a predefined complexity limit.

46. A component of a physical coding sublayer in accordance with claim 40, wherein the portion of said each packet divided into one or more frames comprises a header field, a payload data field, and a frame check sequence field.

47. A component of a physical coding sublayer in accordance with claim 40, wherein the portion of said each packet divided into one or more frames comprises a preamble field, a start frame delimiter field, a header field, a payload data field, and a frame check sequence field.

48. A component of a physical coding sublayer in accordance with claim 40, wherein said each packet further comprises a start symbols field, the component further comprising a 10B extender that extends the start symbols field and the stop symbols field of said each packet to short sequences of 10B that maintain a False_carrier_detect mode.

* * * * *